United States Patent
Yamada et al.

[11] Patent Number: 6,078,690
[45] Date of Patent: Jun. 20, 2000

[54] IMAGE DATA CONVERSION DEVICE AND METHOD HAVING FUNCTION OF INSERTING DELIMITER CODE INTO POSITION IN IMAGE DATA WHERE A PREDETERMINED AMOUNT OF DATA IS REACHED

[75] Inventors: Hidetoshi Yamada, Tokyo; Yutaka Yunoki, Kunitachi; Hirokazu Kuba, Tokyo, all of Japan

[73] Assignee: Olympus Optical Co., Ltd., Tokyo, Japan

[21] Appl. No.: 09/095,819

[22] Filed: Jun. 11, 1998

[30] Foreign Application Priority Data

Jun. 20, 1997 [JP] Japan .................................. 9-164193

[51] Int. Cl.[7] .............................. G06K 9/36; G06K 9/46
[52] U.S. Cl. ........................................ 382/233; 382/250
[58] Field of Search ..................................... 382/232, 239, 382/246, 250, 233; 386/33, 109

[56] References Cited

U.S. PATENT DOCUMENTS 5,537,215  7/1996  Niimura et al. ....................... 386/111
5,699,475  12/1997  Oguro et al. ........................... 386/109

*Primary Examiner*—Phuoc Tran
*Attorney, Agent, or Firm*—Frishauf, Holtz, Goodman, Langer & Chick, P.C.

[57] ABSTRACT

An image data conversion device includes a variable-length code decoder which decodes compressed image data which has been compressed through processes of orthogonal transform, quantization, and variable-length coding. A data amount calculation unit calculates an amount of data that corresponds to a predetermined number of pixels from the results of decoding by the variable-length code decoder. A delimiter code insertion unit inserts a delimiter code in a position in image data where the amount of data calculated by the data amount calculation unit corresponds to the predetermined number of pixels.

8 Claims, 4 Drawing Sheets

IMAGE DATA CONVERSION DEVICE AND METHOD HAVING FUNCTION OF INSERTING DELIMITER CODE INTO POSITION IN IMAGE DATA WHERE A PREDETERMINED AMOUNT OF DATA IS REACHED

BACKGROUND OF THE INVENTION

The present invention relates to an image data conversion device and method for converting image data in accordance with a predetermined format.

Subject images captured on CCDs in still-video cameras are stored in digital form into storage devices such as memory cards, magnetic disks, or optical disks. In this case, each image involves a very large amount of data. For this reason, in order to record as many picture frames as possible in a limited storage capacity, it is required to perform some efficient compression on each digital picture signal.

As an efficient image data compression scheme, coding techniques are widely known that employ orthogonal transform coding and variable-length coding in combination. A typical technique has been set as an ISO (International Standards Organization) standard for compressing still images. This technique is summarized below.

First, image data is divided into blocks of a given size, and each block is subjected to two-dimensional discrete cosine transform (DCT) as orthogonal transform. Subsequent to the DCT, linear quantization is performed for each frequency component and Huffman coding is then performed on quantized values as variable-length coding. In this case, with DC coefficients, the differentials of DC coefficients in adjacent blocks are subjected to Huffman coding. With AC coefficients, on the other hand, a scan, called the zig-zag scan, is made from low-frequency to high-frequency components and two-dimensional Huffman coding is then performed on the number of consecutive zero AC coefficients (0 in value) and the value of the next nonzero AC coefficient.

This operation will be described more specifically with reference to FIG. 6. First, a frame of image data is divided into blocks of a given size (for example, blocks A, B, C, . . . of 8×8 pixels) as shown at (a) in FIG. 6. Two-dimensional discrete cosine transform (DCT) is then performed on each block as orthogonal transform as shown at (b). The resultant data are stored in an 8×8 matrix. Image data, viewed in a two-dimensional plane, has spatial frequencies which are frequency information based on the distribution of grayscale information. Thus, image data is transformed into a DC coefficient and AC coefficients by the DCT transformation. In the 8×8 matrix, data indicating the value (coefficient) of the DC component is stored in the origin (0, 0), data indicating the value of the highest-frequency AC component in the direction of abscissa is stored in the (0, 7) position, data indicating the value of the highest-frequency AC component in the direction of ordinate is stored in the (7, 0) position, and data indicating the value of the highest-frequency AC component in the diagonal direction is stored in the (7, 7) position. In the intermediate positions are stored the values of AC components which correspond with their respective coordinate positions with respect to the origin so that the further away from the origin, the higher the AC component frequency increases. The stored data in each coordinate position in the matrix is next divided by a quantization width for the corresponding frequency component to perform linear quantization on each frequency component (c). The Huffman coding is performed as variable-length coding on the resulting quantized values. For DC components, at this point, a process of taking the differential of DC components in adjacent blocks (hereinafter referred to as DPCM (Differential Pulse Code Modulation)) is performed and the resulting differential is represented by diffDC (d1). The diffDC is expressed by a group number (the number of additional bits) and additional bits that represents the amplitude of diffDC. The group number is Huffman coded to obtain a codeword. The codeword and the additional bits are combined as coded data (e1). The coded data is recorded on a storage medium such as memory card (f).

For AC components as well, each effective (nonzero) AC coefficient is expressed by a group number and additional bits that represent the value of the AC coefficient. For this reason, a zig-zag scan of AC coefficients is made from low-frequency to high-frequency components. Two-dimensional Huffman coding is performed on the number of consecutive zero AC coefficients (zero run length) and the group number of the value of the nonzero AC coefficient that follows the zero AC coefficients to obtain a codeword. The codeword and the additional bits representing the value of the nonzero AC component are combined as coded data (d2, e2). In the Huffman coding, the frequency of occurrence of each of DC and AC components in a frame of picture is estimated and bit assignment is made such that a component whose frequency of occurrence is closer to its peak is assigned a smaller number of bits. And a codeword is provided for each component. The above is the basis of the Huffman coding scheme.

An image data recording scheme having a hierarchical structure and a tile structure which is suited for editing and retention of digital image data on a computer and communications, i.e., a hierarchical data recording scheme has been proposed. As shown in FIG. 7A, this scheme has a feature in that it has a hierarchical structure of images with different resolutions. When an image has H×V pixels, images are also included which are ½, ¼/ ⅛, . . . in the number of pixels. According to this scheme, any image can be fetched which has as many pixels as needed for an application. Since it is not required to open the image of the maximum resolution, the processing speed can be improved. Another feature is that each image is divided into tiles of 64×64 pixels as shown in FIG. 7B. In this system, even in the case where a high-resolution image (H×V pixels in FIG. 7B) is needed, only tiles needed for a present process can be fetched without opening the entire image, thus improving processing speed.

Such a recording scheme has an advantage that an image or a portion of an image which has a resolution suitable for an application can be fetched quickly to meet rapid display and editing requirements.

As described previously, a high-efficiency coding scheme has been proposed for the purpose of storing image data which allows image data to be compressed in an efficient manner, and moreover an image recording scheme has been proposed which is suitable for displaying, editing and processing image data. However, these schemes are not compatible with each other because they are different in image data format. In order to fetch compressed image data from a recording device and manipulate it in a format suitable for editing, a format change is required. In decoding compressed image data to original image information in accordance with the normal procedure and creating hierarchical data from the original image information, complicated, lengthy computations are involved, and moreover the image quality degrades.

BRIEF SUMMARY OF THE INVENTION

It is therefore an object of the present invention to provide an image data conversion device and method which permits image data to be converted with straightforward circuitry and in a short processing time without degradation of image quality.

According to an aspect of the present invention, there is provided an image data conversion device comprising: a variable-length code decoding unit for performing variable-length code decoding on image data compressed through processes of orthogonal transformation, quantization and variable-length coding; a data amount calculation unit for calculating the amount of data corresponding to a predetermined number of pixels from the results of decoding by the variable-length code decoding unit; and a delimiter code insertion unit for inserting a predetermined delimiter code in a delimited position in the image data where the amount of data calculated by the data amount calculation unit corresponds to the predetermined number of pixels.

According to another aspect of the present invention, there is provided an image data conversion method comprising the steps of: performing variable-length code decoding on image data compressed through processes of orthogonal transformation, quantization, and variable-length coding; calculating the amount of data corresponding to a predetermined number of pixels from the results of decoding by the variable-length code decoding step; and inserting a predetermined delimiter code in a delimited position in the image data where the amount of data calculated by the data amount calculation step corresponds to the predetermined number of pixels.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

Figure 1:
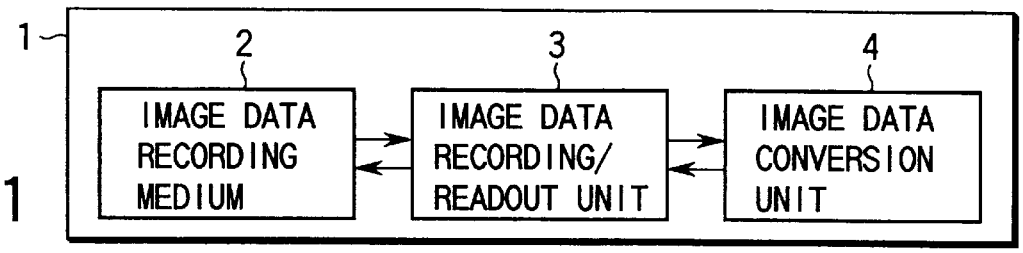
FIG. 1 is a schematic block diagram of an image recording/reproduction device to which an image data conversion device of the present invention is applied.

Referring now to FIG. 1, there is illustrated, in block diagram form, an image recording/reproduction device incorporating an image data conversion device of the present invention. The image recording/reproduction device 1 comprises an image data storage medium 2 consisting of, for example, a memory card, an image data recording/readout unit 3, and an image data conversion unit 4. In such a device configuration, in image data conversion processing, a compressed image data file is read from the image data recording medium 2 through the image data recording/readout unit 3 and then fed into the image data conversion unit 4. The format of input image data is identified and then variable-length codes in the compressed image data are decoded in accordance with the image data format. A predetermined amount of image data corresponding to a predetermined number of pixels is computed from the decoded data and a predetermined delimiter code is then inserted each time the predetermined number of pixels is counted. The resulting image data is recorded again on the image data recording medium 2 through the image data recording/readout unit 3. After the insertion of the delimiter codes, the amount of image data increases by several percent with respect to the amount of the original image data. In some cases, therefore, the delimiter code-inserted image data cannot be recorded in the original area of the recording medium. In that case, the image data recording/readout unit 3 reestablishes the data recording area of the image data recording medium 2 on which the processed image data is recorded again.

Figure 2:
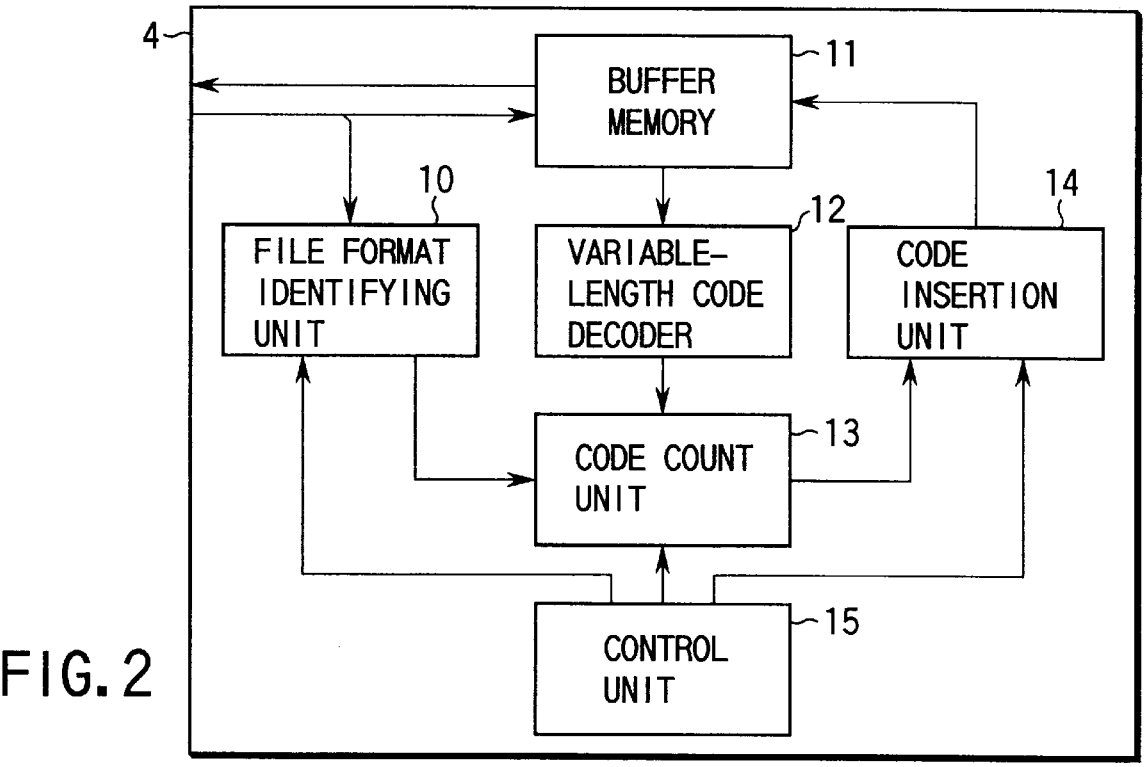
FIG. 2 is a block diagram of an image data conversion device embodying of the present invention.

FIG. 2 shows an arrangement of the image data conversion unit 4 according to a first embodiment of the present invention, which comprises a file format identification unit 10, a buffer unit 11, a variable-length code decoder 12, a code count unit (data amount computation unit) 13, a code insertion unit 14, and a control unit 15.

In the image data conversion unit thus arranged, input image data has its file format identified in the file format identification unit 10 under the control of the control unit 15. In JPEG (an international standard for compressing still images using orthogonal transform coding and variable-length coding in combination), a predetermined code (marker code) is defined to represent data characteristics. Compressed data for a single image is headed by a marker SOI and ended by a marker EOI. The marker code SOI is followed by a marker code SOF where the image size, components specifications, sampling ratios for luminance and chrominance (or color difference) signals are indicated. In some cases, the SOF follows an application marker code APPn (n is an integer) which represents an image data format (image data standard name) that defines components specifications, sampling ratios for luminance and color difference signals, and so on which conform with an assumed application. Further, in a specific application, a unique file header is defined and recorded prior to compressed data.

Thus, the file format identification unit 10 can examine either of the file header, the APPn marker, and the SOF marker to identify the image data format that provides information on components specifications, sampling ratios for luminance and color difference signals, and so on.

The most important function of the file format identification unit 10 is to detect what file format image data has or what component specifications and what sampling ratios for luminance and color difference signals the image data format in a file has.

After that, compressed image data that follows the marker code SOF is read into the buffer memory 11 and variable-length codes are then decoded in the variable-length code decoder 12. Normally, tables for variable-length codes, or Huffman codes, are recorded by the DHT marker in image data. Decoding of Huffman codes using the Huffman coding tables provides DC components (expressed in terms of diffDC), and quantized DCT-transformed AC components. The DC component is obtained for each block of 8×8 pixels, on which DCT transformation is made. By counting the number of blocks in the code count unit 13, therefore, it becomes able to know the number of pixels through which the image data has been decoded.

Assume here that a color image signal is represented by a luminance component Y and color difference components Cr and Cb and each color component is subsampled by a factor of two in the horizontal and vertical dimensions relative to the luminance component Y (this format is normally referred to as 4:2:0). Assume that the components are recorded with data interleaving. That is, the components are recorded in units each of four (2×2) blocks for luminance component Y, one block for Cr, and one block for Cb. The unit of these six blocks is referred to as the minimum coded unit (MCU).

Figure 3:
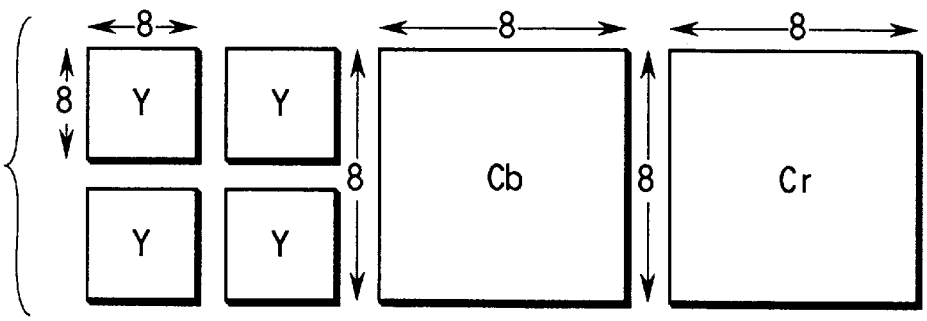
FIG. 3 shows the structure of a minimum coded unit (MCU) according to a first embodiment of the present invention.

FIG. 3 shows the MCU structure in the 4:2:0 format. Since an image tile in the hierarchical data recording system consists of 64×64 pixels as described previously, it is desirable to insert a delimiter code (marker code RST) into compressed image data every horizontal 64 pixels. Four MCUs are present for 24 DC components, and horizontal two blocks (16 pixels) and vertical two blocks (16 pixels) of luminance component are obtained for each MCU. The code insertion unit 14 thus inserts a marker code RST in the luminance component in each position corresponding to four MCUs. For the color difference components, the insertion position corresponds to horizontal 32 pixels and the marker is inserted by interpolation when structuring hierarchical data.

To actually insert the RST marker code every four MCUs, coded data through the $24^{th}$ DC component in compressed data read into the buffer memory 11 are skipped over as they are recorded. The position immediately prior to the Huffman code corresponding to the $25^{th}$ DC component is detected by the code count unit 14 as a delimited position. Subsequently, the code insertion unit 14 inserts the RST marker. In this case, the beginning of the RST marker must align on a byte boundary. Where the delimited position does not align on a byte boundary, bit stuffing is performed to cram 1 bits to thereby complete a byte. If byte data FF is produced by the bit stuffing, then byte stuffing is performed by inserting byte data 00 to distinguish the byte data FF from the marker code. After that, the RST marker code is inserted.

The insertion of the first delimiter data thus terminates. The data so far is transferred from the buffer memory 11 to the recording medium 11 to rewrite the image data. After that, next compressed data is read anew into the buffer memory 11. The Huffman decoding is performed in the variable-length decoder 12 to obtain a DC component and AC components in quantized DCT-transformed coefficients. The DC value obtained in this block represents the differential of the DC components in the current block and the previous block. Since the RST marker has been inserted into this block, the DPCM is reset and the DC component itself in the block is encoded again into compressed data. For DC components in subsequent blocks for the luminance component in which no RST is inserted, this operation is not needed, but the DPCM is likewise reset for the DC components in the first color difference blocks in the same MCU.

The conversion of image data is performed by repeating the insertion of the RST marker code, the bit stuffing, and the resetting of DPCM for next DC component every four MCUs as described previously. If byte data FF is produced by displacement of the byte boundary, then byte stuffing is performed by inserting byte data 00. The addition of the RST marker code makes it necessary to record or change the definition of the RST marker code in compressed image file data. This is performed by recording or changing the contents of the DRI marker code that follows the SOI marker code. When a change is made to the contents of the application marker APPn by the above conversion process, the file contents are changed accordingly.

The conversion of image data is made in the manner described above. According to this embodiment, the position where image data is delimited is found and a delimiter code is inserted into this position with a minimum of data format change. For this reason, the conversion of image data can be made without causing degradation of the image data unlike the case where compressed data is decompressed temporarily and the decompressed data is compressed again after a delimiter code has been inserted.

Figure 5:
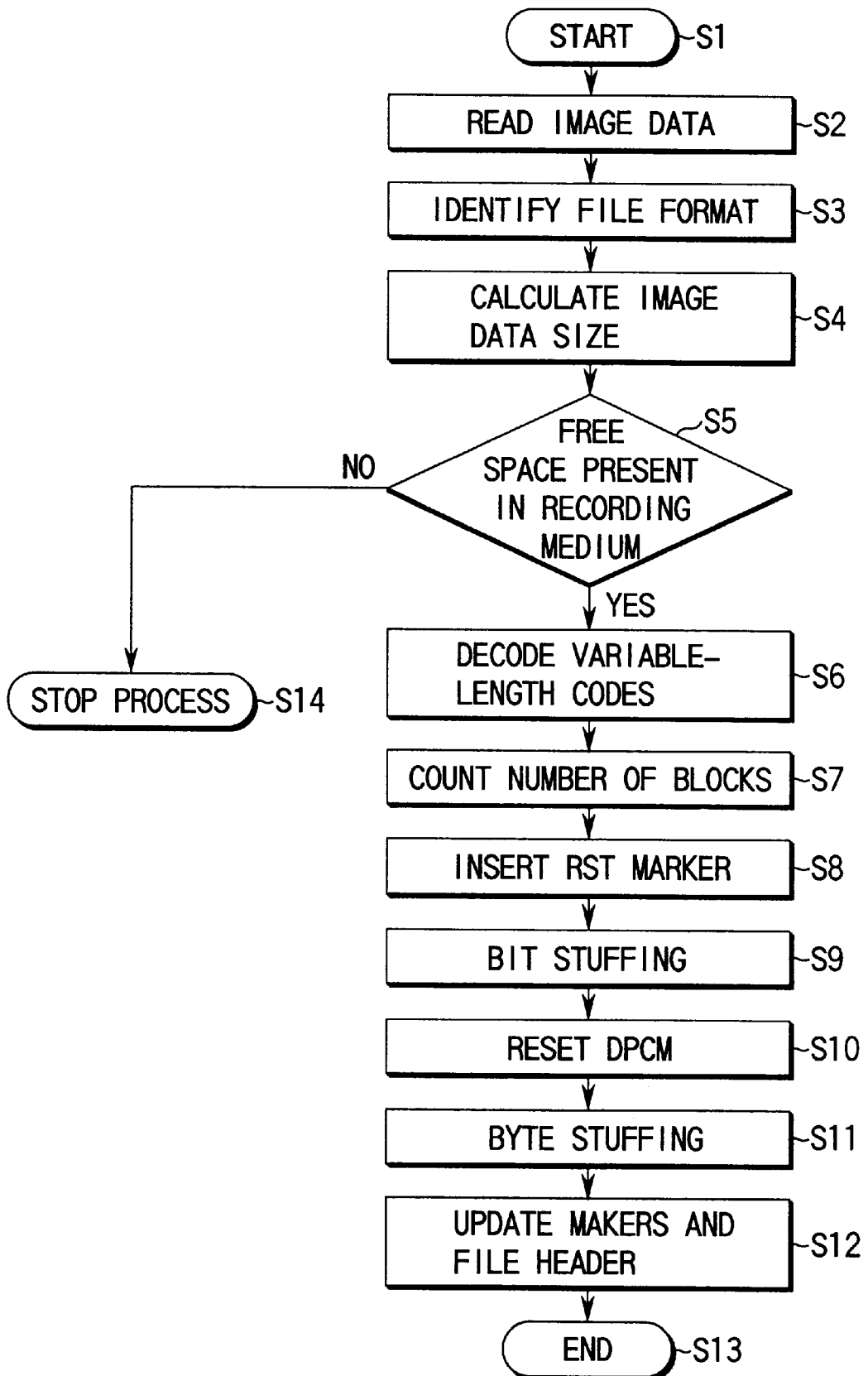
FIG. 5 is a flowchart for the conversion process according to the second embodiment of the present invention.
Figure 6:
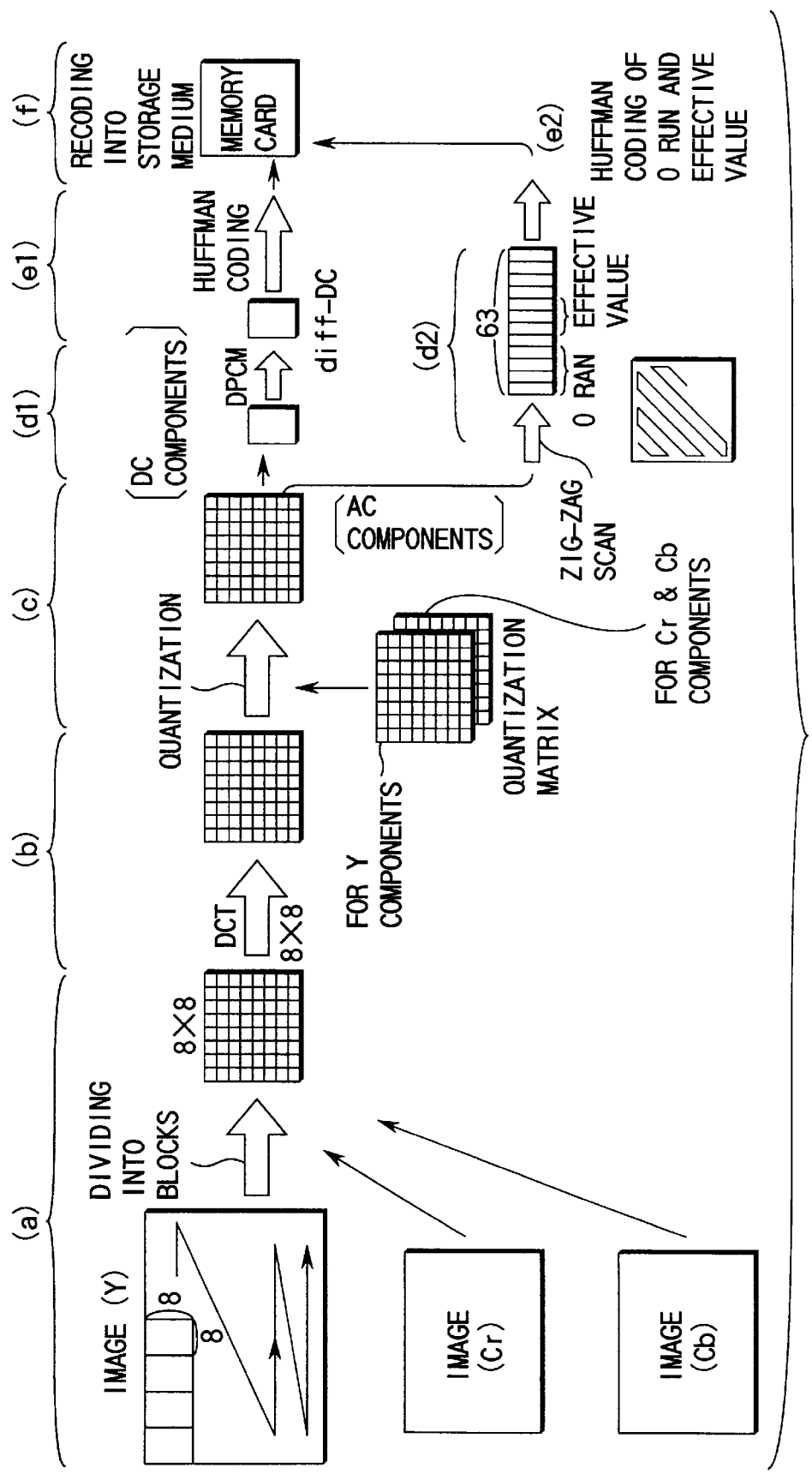
FIG. 6 is a diagram for use in explanation of a high-efficiency image data compression scheme.
Figure 7A:
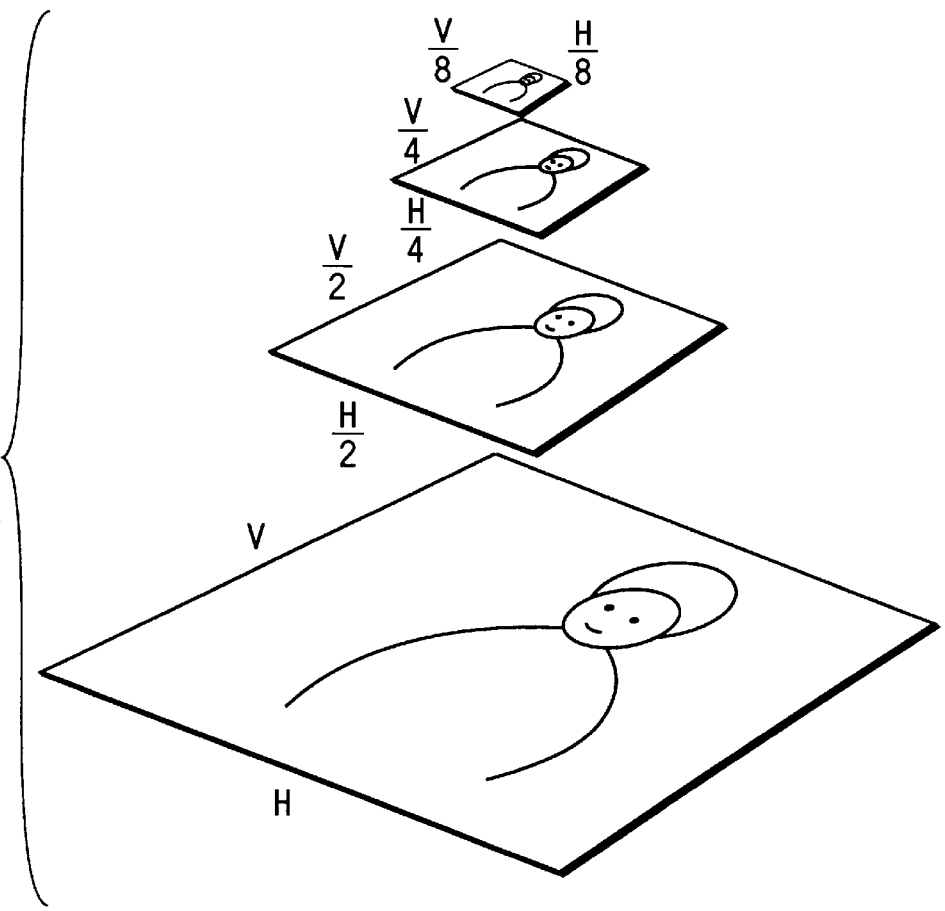
FIGS. 7A and 7B are diagrams for use in explanation of an image data recording scheme which has a hierarchical structure and a tile structure suitable for editing a digitized image on a computer.
Figure 7B:
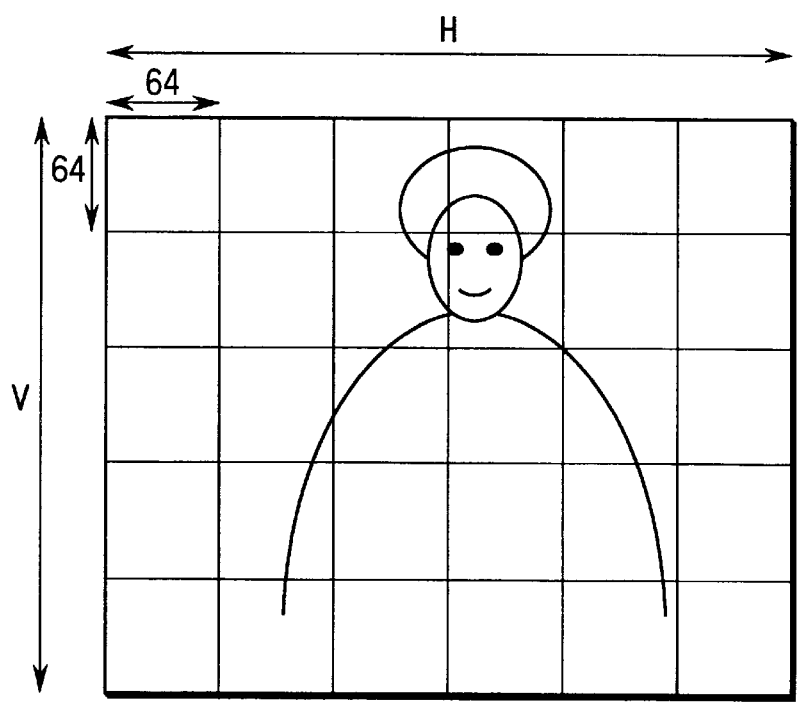

A second embodiment of the present invention will be described next. In the second embodiment, it is assumed that the conversion process is performed on a programmable computer. The conversion process in the second embodiment will be described with reference to a flowchart illustrated in FIG. 5.

First, in step S1, the conversion process is started. Image data recorded on a recording medium, such as a floppy disk, is read into a memory in the conversion device (step S2) and its file format is then identified (step S3). Here, either the file header, the APPn marker, or the SOF marker is examined to identify the file format and the image data format. Further, the image data size is identified to compute an increase in the amount of data due to the conversion process (step S4). The amount of free storage space of the recording medium is checked (step S5). In the absence of free space large enough to record the image data the amount of which increased as a result of the conversion process, a message to that effect is displayed to stop the process (step S14). In the presence of free space large enough to record the processed image data, on the other hand, decoding of variable-length codes is performed (step S6).

Figure 4:
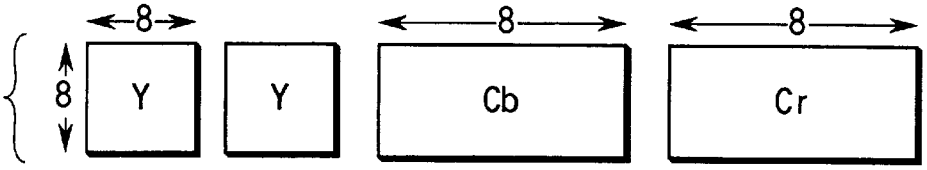
FIG. 4 shows the structure of an MCU according to a second embodiment of the present invention.

The second embodiment assumes that the color difference components Cr and Cb are subsampled by a factor of two only in the horizontal dimension relative to the luminance component Y and recorded with data interleaving. This format is referred to as 4:2:2. The MCU is therefore composed, as shown in FIG. 4, of a total of four blocks: two blocks (horizontal two blocks) from the Y component, one block from the Cr component, and one block from the Cb component. Since each image tile in the hierarchical data recording system is composed of 64×64 pixels, it is desirable to insert a delimiter code (the marker code RST) in compressed image data every horizontal 64 pixels. Four MCUs are available at the time when 24 DC components are obtained and, for each MCU, horizontal two blocks (16 pixels) and vertical two blocks (16 pixels) are obtained from the luminance component; therefore, the RST has only to be inserted in each position separated by four MCUs.

The variable-length codes are decoded to obtain DC components and AC components (step S6). In subsequent step S7, the number of decoded DC components is counted to detect the number of blocks in image data which has been decoded so far. The $16^{th}$ DC component and the following AC components are skipped over without being decoded. The RST marker is inserted into the position immediately before the Huffman code corresponding to the 17$^{th}$ DC component as a delimited position (step S8) and bit stuffing is performed (step S9). The DPCM is reset for the DC component in the first block of the next MCU (step S10). The DC component is coded again into compressed data.

By repeating the insertion of the RST marker for every four MCUs, bit stuffing, and DPCM resetting for the next DC component, image data is converted. If, in the conversion process, the byte data FF is produced, then byte stuffing is performed (step S11). The addition of the RST marker makes it necessary to record or change the definition of the RST in compressed image file data. Here, the DRI marker, the application marker APPn and the file header are updated (step S12) and the conversion process comes to an end (step S13).

The above-described process will not damage the original compressed data because the process is stopped when the recording medium has not as much free space as needed. In the presence of sufficient free space, high-speed conversion process can be performed with a minimum of data change without causing degradation of image data.

According to the present invention, image data can be converted through the use of simple circuitry within a short processing time without causing image degradation. In addition, the conversion method of the present invention allows many compressed data files to be converted without degradation which have been compressed without taking into consideration the conversion to hierarchical image data format.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image data conversion device comprising:
    a variable-length code decoding unit for performing variable-length code decoding on image data compressed through processes of orthogonal transformation, quantization and variable-length coding;
    a data amount calculation unit for calculating the amount of data corresponding to a predetermined number of pixels from the results of decoding by the variable-length code decoding unit; and
    a delimiter code insertion unit for inserting a predetermined delimiter code in a delimited position in the image data where the amount of data calculated by the data amount calculation unit corresponds to the predetermined number of pixels.

2. The image data conversion device according to claim 1, wherein a position for inserting the delimiter code is determined on the basis of a data structure which depends on a recording method having a tile structure and a predetermined color signal method.

3. The image data conversion device according to claim 2, wherein the delimited position is found by skipping over coded data until a predetermined number of DC components appear and determining as the delimited position the position in the image data which is immediately before a Huffman code representing a DC component next to the last DC component in the predetermined number of DC components.

4. The image data conversion device according to claim 3, wherein the delimiter code insertion unit performs bit stuffing to complete a byte when the delimited position does not align on a byte boundary.

5. The image data conversion device according to claim 4, wherein, when FF byte data is produced by the bit stuffing, the delimiter code insertion unit performs byte stuffing to stuff specific bytes.

6. An image data conversion method comprising the steps of:
    performing variable-length code decoding on image data compressed through processes of orthogonal transformation, quantization, and variable-length coding;
    calculating the amount of data corresponding to a predetermined number of pixels from the results of decoding by the variable-length code decoding step; and
    inserting a predetermined delimiter code in a delimited position in the image data where the amount of data calculated by the data amount calculation step corresponds to the predetermined number of pixels.

7. An image data conversion method comprising the steps of:
    identifying the file format and image data format of compressed data read from a recording medium;
    decoding the compressed image data to obtain DC components and AC components;
    counting the number of blocks associated with the decoded DC components;
    inserting a delimiter code in a delimited position in image data which is immediately before a code corresponding to a DC component associated with a predetermined block counting from the first decoded block;
    determining whether or not the delimited position aligns on a byte boundary;
    when it is determined that the delimited position does not align on a byte boundary, performing bit stuffing to complete a byte; and
    resetting a DPCM process for a DC component resulting from decoding of compressed image data next read.

8. The image data conversion method according to claim 7, further comprising the step of changing and re-recording the contents of the file and the contents of the image data.

* * * * *